United States Patent Office 3,154,534
Patented Oct. 27, 1964

3,154,534
POLYETHYLENEOXY AZO FUGITIVE TINTS
Donald J. Gale and Hans H. Kuhn, Spartanburg, S.C.,
assignors to Deering Milliken Research Corporation,
Spartanburg, S.C., a corporation of Delaware
No Drawing. Filed Jan. 30, 1962, Ser. No. 169,961
2 Claims. (Cl. 260—198)

This invention relates to novel blue tints having substantially complete fugitivity for substantially all textile fibers.

The novel tints of this invention have the formula

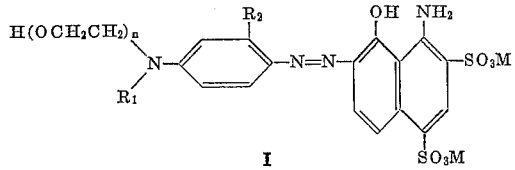

I wherein $n$ is an integer between about 15 and 500; $R_1$ is $H(OCH_2CH_2)_n-$, $n$ having the value given above, aryl, alkyl, arlkaryl or aralkly, $R_2$ is hydrogen, alkyl, aryl, alkaryl, aralkyl or alkoxy, and M is alaki-metal.

In the above compounds, when $R_1$ is $H(OCH_2CH_2)_n-$ $n$ is preferably between about 25 and 100 and more preferably between about 35 and 75; aryl, alkyl, alkaryl, aralkyl and alkoxy preferably contain from one to twelve carbon atoms, and preferably are hydrocarbon, e.g., phenyl, naphthyl, methyl, ethyl, propyl, tolyl, mesityl, benzyl, phenethyl, etc., any substituents thereon being of a non-functional and non-reactive nature which will not interfere in the reactions described below for preparing such compounds. When $R_1$ is other than $$H(OCH_2CH_2)_n-$$

$n$ is preferably twice the above values.

These tints have a pure blue color which produces a rich green when blended with a yellow fugitive tint, they are adequately acid and base stable, and are very fugitive with respect to all textile fibers, according to the standards set forth by the industry for fugitive tints useful for temporarily identifying fibers, yarns or fabrics. A tint of any structure having these properties is extremely difficult to obtain and is rare even in the class of tints having a polyethoxy group in the molecule.

The compounds of this invention are prepared by the following series of reactions.

With the exception of Compound II, where $n$ is 1 when $R_1$ is $H(OCH_2CH_2)_n$, $R_1$, $R_2$, $n$ and M have the values given above.

The following preparations and examples are illustrative of the compounds of this invention and methods for their preparation.

PREPARATION I

One mole (195 g.) of N,N-di-(hydroxyethyl)-M-toluidine, (II; $R_1=HOCH_2CH_2-$, $R_2=CH_3$) in a flask equipped with stirrer, thermometer and gas inlet tube near the bottom and a gas outlet tube near the top of the flask, is heated to 140° C. under nitrogen. About 200 mg. of sodium is added as catalyst. Ethylene oxide is bubbled into the molten, vigorously stirred material at a rate such that a slight amount of gas escapes from the outlet tube. The ethylene oxide addition is continued, with cooling to maintain the temperature between about 140–160° C., until the reaction mass weighs 700 g. A 100 g. portion of this mass is transferred to a new reaction flask with 70 mg. of sodium and ethylene oxide is added until the transferred mass weighs 644 g., thus producing N,N-di(hydroxyethylpolyethyleneoxy)-aniline containing a total of about 100 ethyleneoxy groups (III;

$$R_1=H(OCH_2CH_2)_n-$$

$n=50$, $R_2=CH_3$). This compound melts at about 53° C.

PREPARATION II

The procedure of Preparation I is followed substituting one mole (182 g.) of N,N-dihydroxyethyl-aniline as the starting material. There is thus-produced N,N-di(hydroxyethylethylpolyethyleneoxy)-aniline containing a total of about 100 ethyleneoxy groups (III;

$$R_1=H(OCH_2CH_2)_n-$$

$n=50$, $R_2=H$) also melting at about 53° C.

PREPARATION III

About 1 mole (4,512 g.) of N,N-di(hydroxyethylpolyethyleneoxy)-aniline obtained according to the procedure of Preparation I (III; $R_1=H(OCH_2CH_2)_n$, $n=50$, $R_2=H$) is dissolved in a mixture of 4 liters of water and 2.14 moles (206.6 g.) of 37.8% hydrochloric acid. The mixture is cooled to 0–5° C. and with stirring a solution of 1.07 moles (74 g.) of sodium nitrite in 250 ml. of water is added over a 30 minute period, maintaining the

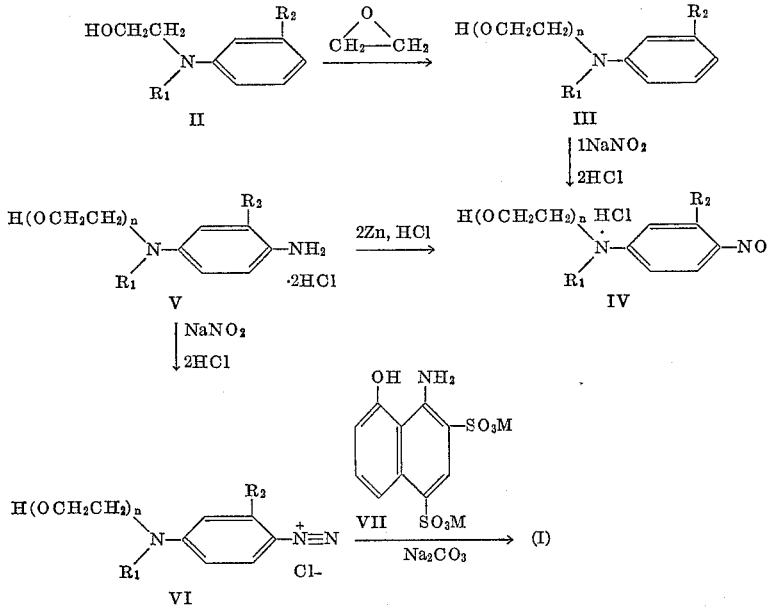

mixture at the temperature and continuing the stirring for an additional 30 minutes when the addition is complete. There is thus-produced the p-nitroso derivative of the starting compound, which compound should immediately thereafter be reduced to the more stable p-amino derivative.

PREPARATION IV

Following the procedure of Preparation III, N,N-di(hydroxyethylpolyethyleneoxy)-aniline, prepared according to the procedure of Preparation II, is converted to the corresponding p-nitroso compound (IV;

$n=50$, $R_2=H$).

PREPARATION V

To the cool solution obtained according to Preparation III, containing the N,N-di(hydroxyethylpolyethyleneoxy-p-nitroso-m-toluidine (IV;

$n=50$, $R_2=CH_3$), is added 7 moles (676 g.) of 37.8% hydrochloric acid with stirring followed by 3.5 moles (225 g.) of zinc dust. One-half of the latter is added over a thirty minute period followed, fifteen minutes later, by the remaining half over an additional thirty minute period. Stirring is continued until the characteristic yellow compound of the nitroso compound disappears, keeping the temperature at all times below 20° C. The excess zinc is removed by filtration leaving a clear solution containing the hydrochloric acid salt of N,N - di(hydroxyethylpolyethyleneoxy) - p - tolylenediamine.

PREPARATION VI

Following the procedure of Preparation V, N,N-di-(hydroxyethylpolyethyleneoxy) - p - nitroso - aniline, prepared according to the procedure of Preparation IV, is converted to N,N-di(hydroxyethylpolyethyleneoxy)-p-phenylenediamine (V; $R_1=H(OCH_2CH_2)_n$—, $n=50$, $R_2=H$).

PREPARATION VII

To the solution obtained according to the procedure of Preparation V containing the hydrochloric acid salt of N,N - di(hydroxyethylpolyethyleneoxy) - p - tolylenediamine (V; $R_1=H(OCH_2CH_2)_n$, $n=50$, $R_2=CH_3$), is added 193 grams of 37.8% hydrochloric acid and the mixture is cooled to 0° C. With vigorous stirring and cooling to maintain the temperature below about 5° C., a solution of 1.01 mole (70 g.) of sodium nitrite in 280 ml. of water is quickly added. After 30 minutes, the excess nitrous acid is destroyed with sulfamic acid to provide a negative starch-iodide test. The solution is then carefully brought to a pH of 4 with dilute aqueous sodium carbonate, to provide the diazonium salt of N,N-di(hydroxyethylpolyethyleneoxy) - p - tolylenediamine (VI; $R_1=H(OCH_2CH_2)_n$—, $n=50$, $R_2=CH_3$).

PREPARATION VIII

Following the procedure of Preparation VII, N, N-di(hydroxyethylpolyethyleneoxy) - p - phenylenediamine, prepared according to the procedure of Preparation VI, is converted to the corresponding diazonium salt (VI; $R_1=H(OCH_2CH_2)_n$, $n=50$, $R_2=H$).

Following the procedure of Preparations I–VIII, other compounds represented by Formula II, e.g., N,N-di(hydroxyethyl)-substituted m-toluidine, m-anisidine, m-diphenylamine, m-benzylaniline, m-tolylaniline, m-phenethylaniline and N-hydroxyethyl-substituted N-methyl-aniline, N-ethylaniline, N-phenylaniline, N-benzylaniline, N-tolylaniline, N-phenethylaniline, N-methyl-m-toluidine, N-methyl-m-anisidine, N-methyl-m-benzylaniline, and N-methyl-m-phenyl-aniline, are converted to the corresponding diazonium salts, i.e., compounds represented by Formula VI containing a total of about 100 polyethyleneoxy groups.

Similarly, the N,N-di(hydroxyethylpolyethyleneoxy) and N-hydroxyethylpolyethyleneoxy diazonium compounds represented by Formula VI and containing a total of about 15, 30, 50, 75, 100, 250 or 500 ethyleneoxy groups, and otherwise corresponding to the above-named compounds are prepared from the corresponding N,N-di(hydroxyethyl)- and N-hydroxyethyl compounds represented by Formula II by varying the amount of ethylene oxide reacted with the N,N-di(hydroxyethyl) or N-hydroxyethyl compound in the reaction described in Preparations I and II.

*Example*

One mole, calculated on the basis of pure material, of 2-amino-1-naphthol-3,5-disulfonic acid (Chicago Acid) is dissolved in 1 liter of water and the solution brought to neutrality with sodium carbonate. To this solution is then added 4.5 moles (477 g.) of sodium carbonate and 200 g. of ice. To this cold solution is slowly added with vigorous stirring the still cold solution of the diazonium salt of N,N-di(hydroxyethylpolyethyleneoxy)-p-tolylenediamine (VI; $R_1=H(OCH_2CH_2)_n$, $n=50$,

obtained according to the procedure of Preparation IV. The brilliant blue tint is formed almost immediately. After one hour the mixture is filtered and neutralized with hydrochloric acid to a pH of 7. The tint is isolated by evaporation of the water at about 60° C. under vacuum, dissolving the tint in benzene, toluene or xylene, filtering salts which precipitate, and distilling the solvent. A melt of the purified tint is obtained which solidifies on cooling.

*Example II*

Following the procedure of Example I exactly, but substituting the diazonium salt of N,N-di(hydroxyethylpolyethyleneoxy)-p-phenylenediamine prepared according to the procedure of Preparation VIII, there is produced the corresponding Chicago Acid coupling reaction product (I; $R_1=H(OCH_2CH_2)_n$—, $n=50$, $R_2=H$) which is a brilliant blue fugitive tint.

Following the procedure of Example I, each of the diazonium compounds named in the paragraph following Preparation VIII containing a total of 100 ethyleneoxy groups react with 2-amino-1-naphthol-3,5-disulfonic acid to produce the corresponding coupling reaction product, i.e., compounds represented by Formula I wherein in the first six of the above described compounds, $R_1$ is

$n$ is about 50, and $R_2$ is methyl, methoxy, phenyl, benzyl, tolyl, and phenethyl, respectively, and in the remaining compounds $n$ is about 100, and $R_1$ and $R_2$ are methyl and H, ethyl and H, phenyl and H, benzyl and H, tolyl and H, phenethyl and H, methyl and methyl, methyl and methoxy, methyl and benzyl, and methyl and phenyl, respectively.

Similarly, the N,N-di(hydroxyethylpolyethyleneoxy) and N-hydroxyethylpolyethyleneoxy compounds containing a total of about 15, 30, 50, 75, 100, 250 or 500 ethyleneoxy groups and otherwise corresponding to the above-named diazonium salts (VI) can be coupled with 2-amino-1-naphthol-3,5-disulfonic acids to produce other blue fugitive tints of this invention represented by Formula I.

What is claimed is:
1. A compound of the formula
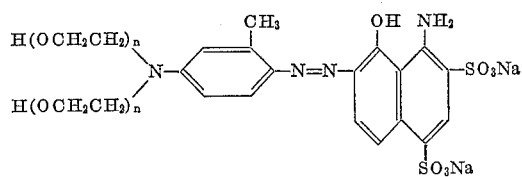
wherein $n$ is about 50.
2. A compound of the formula
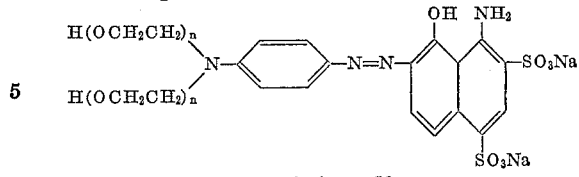
wherein $n$ is an integer of about 50.
References Cited in the file of this patent
UNITED STATES PATENTS
2,131,712    Schoeller et al. _____ Sept. 27, 1938